United States Patent [19]

Godino et al.

[11] 3,847,751
[45] Nov. 12, 1974

[54] RECOVERY AND HANDLING OF ASPHALT CONTAINING A HIGH CONCENTRATION OF ASPHALTENE

[75] Inventors: Rino L. Godino, Livingston; Oliver Morfit, Green Village, both of N.J.

[73] Assignee: Foster Wheeler Corporation, Livingston, N.J.

[22] Filed: June 12, 1973

[21] Appl. No.: 369,338

[52] U.S. Cl............... 196/155, 208/39, 208/86
[51] Int. Cl............... B01d 11/00, C10g 21/00
[58] Field of Search ........ 196/155, 14.52, 104, 105; 208/309, 86, 39; 165/65; 134/72, 131; 264/13, 14, 237; 106/279

[56] References Cited
UNITED STATES PATENTS

| | | |
|---|---|---|
| 2,943,050 | 6/1960 | Beavon .................. 208/86 |
| 3,197,413 | 7/1965 | Wingerd ................. 208/39 |
| 2,398,440 | 4/1946 | Monnet .................. 134/72 |

Primary Examiner—Norman Yudkoff
Assistant Examiner—D. Sanders
Attorney, Agent, or Firm—John E. Wilson; Marvin A. Naigur

[57] ABSTRACT

Asphalt produced as a by-product in a solvent deasphalting process is treated to result in a useful by-product. The asphalt-solvent mix is heated, subsequently the solvent is separated out as vapor and the asphalt is cooled to produce either a liquid useful as a fuel oil, a flaked material or as a powdered material which are also useful in industry.

2 Claims, 4 Drawing Figures

WATER SPRAYS

AIR

AIR    WATER SPRAYS

RECOVERY AND HANDLING OF ASPHALT CONTAINING A HIGH CONCENTRATION OF ASPHALTENE

BACKGROUND OF THE INVENTION

Solvent deasphalting produces two products. The primary product, deasphalted oil, is in greater demand than is the secondary product which is asphalt. Deasphalted oil can be processed into a low sulfur fuel which is highly desirable since, when burned, it does not pollute the atmosphere as much as oils which are high in sulfur content. Conventionally, when heavy oil is deasphalted for subsequent lubricating oil production, more asphalt is produced than deasphalted oil. This is unfortunate because of the lower value placed on asphalt than on deasphalted oil.

It is possible to process heavy oil in a deasphalting tower so that the deasphalted oil which is produced, will be five or ten times as much as the asphalt. Unfortunately, when the ratio of deasphalted oil to asphalt is high, the asphalt which is produced is very heavy. It is solid at fairly high temperatures and difficult to handle.

SUMMARY OF THE INVENTION

It is an object of the present invention to overcome drawbacks found in the prior art such as those discussed above. Accordingly, asphalt from a solvent deasphalting tower is heated and the solvent allowed to separate therefrom and then cooled to produce a useful liquid or solid by-product.

DETAILED DESCRIPTION OF THE PREFERRED EMBODIMENT

Figure 1:
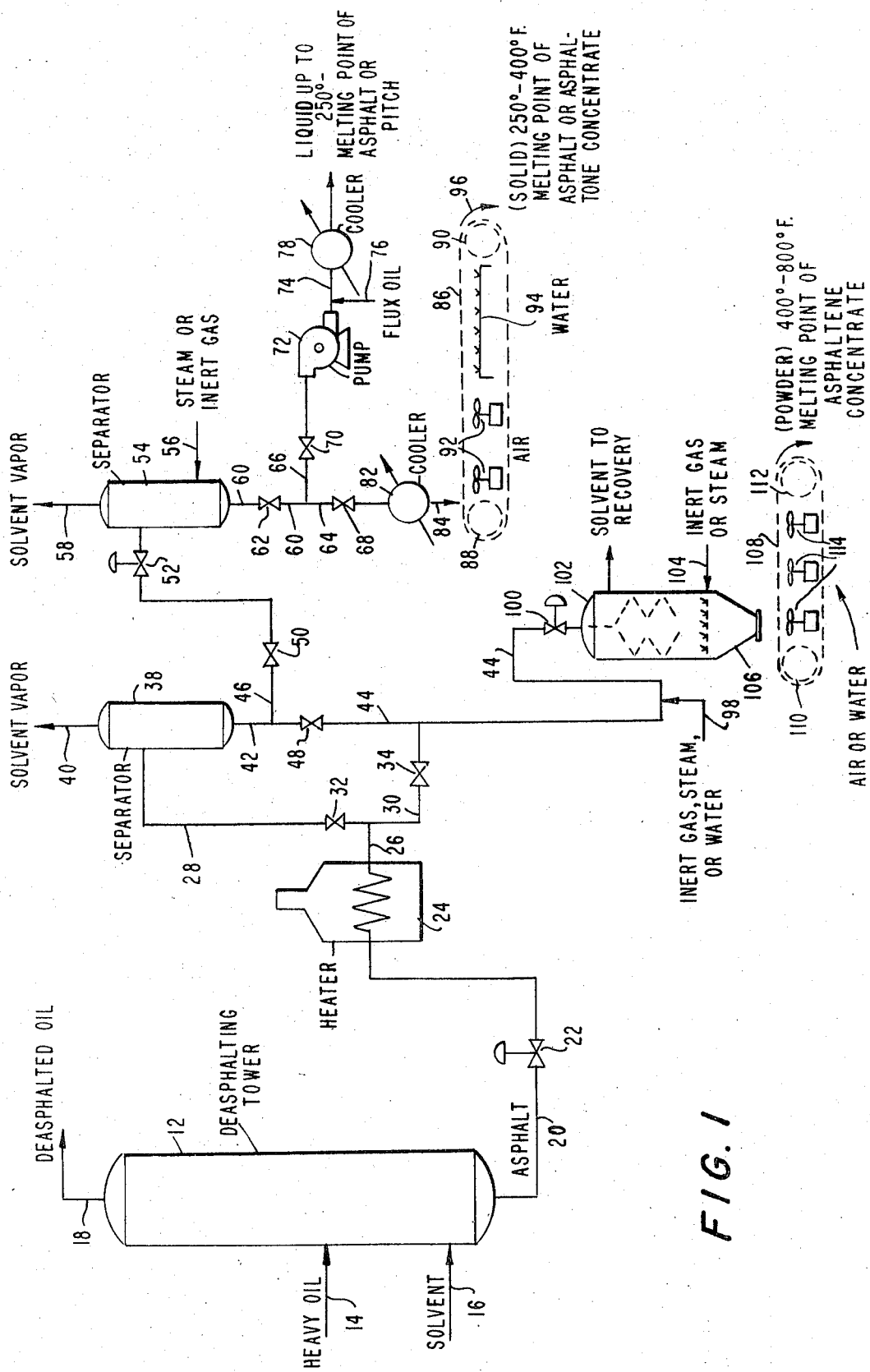
FIG. 1 shows schematically the present invention used to treat asphalt from a solvent deasphalting tower.

FIG. 1 shows schematically apparatus for handling and treating asphalt from a deasphalting tower 12. Heavy oil is fed into the deasphalting tower through a line 14 and solvent is fed into the tower through a line 16. The deasphalting tower 12 is a "deep deasphalting" tower, that is, one which produces a high ratio of deasphalted oil to asphalt. Such towers produce asphalt at a high temperature having a high concentration of asphaltene. The deasphalted oil leaves the deasphalting tower 12 through a line 18 and the asphalt leaves the tower 12 through a line 20. The deasphalted oil with solvent leaving the tower 12 through the line 18 is the primary product produced in the deasphalting tower and may be handled and treated in accordance with conventional methods. The asphalt solvent mix leaving the tower 12 through the line 20 passes through a valve 22 in the line 20 and into a heater 24. While in the heater 24, the asphalt is heated to a temperature of between approximately 550°F. to approximately 700°F. The asphalt leaves the heater 24 through a line 26 which is connected to two lines 28 and 30. A valve 32 is placed in the line 28 and a valve 34 is placed in the line 30. The line 28 connects the line 26 to a separator 38 so that when the valve 32 is open asphalt will flow from the heater 24 to the separator 38. The purpose of line 30 is explained below.

The separator allows solvent vapor to separate from the asphalt and leave through a line 40. Asphalt leaves the separator 38 through a line 42 which connects with two lines 44 and 46. The line 44 has in it a valve 48 while the line 46 has in it a valve 50. The valves 48 and 50 permit selection between the lines 44 and 46 for flowing asphalt. It is also possible to allocate to each of the lines 44 and 46 a desired portion of the asphalt coming through 42. A pressure reducing valve 52 is placed in the line 46 between the valve 50 and a separator 54. The separator 54 is maintained at a pressure lower than that within the separator 38. Steam or inert gas is charged through line 56 into the separator 54 and solvent vapor leaves the separator 54 through a line 58. Asphalt leaves the separator 54 through a line 60 which has in it a valve 62. The line 60 terminates at a connection with lines 64 and 66. The line 64 has in it a valve 68 and the line 66 has in it a valve 70. The valves 68 and 70 permit selection between lines 64 and 66 for flowing asphalt coming out of the line 60. They also permit allocation to the lines 64 and 66 of portions of the asphalt coming through the line 60.

The line 66 leads to a pump 72 which exhausts the asphalt into a line 74. Flux oil may be fed through a line 76 and into the line 74. The line 74 leads to a cooler 78 for cooling asphalts having a melting point of approximately 250°F or lower. The flux oil is used to reduce viscosity. It is useful under certain conditions to make fuel oil to burn in the refinery. The fuel oil which leaves the cooler 78 will normally have a high concentration of sulfur. If it cannot be burned or if the liquid which leaves the cooler 78 without the addition of flux oil through the line 76 is unusable, the asphalt flowing through the line 60 may be flowed through the line 64 to a cooler 82. This is accomplished by closing the valve 70 and opening the valve 68.

The cooler 82 dumps through a chute 84 onto a moving belt 86 which moves over rollers 88 and 90. The belt is cooled as by air which is moved through the belt by fans 92 and/or water which is sprayed on the bottom of the belt through the line 94. The asphalt material coming out of the line 74 will solidify on the belt 86 to a solid material which is mostly asphaltene. It drops off the belt at 96. The asphaltene at 96 is in the form of flakes.

If it is desired to produce asphaltene in powder or pellet form, the valve 32 in the line 28 is closed and the valve 34 in the line 30 is opened so that the asphalt flows down the line 44. Inert gas, steam or water is injected into the line 44 through line 98. A valve 100 is placed in the line 44 between the line 98 and a spray tower 102. Inert gas or steam is injected through line 94 into the bottom of the spray tower 102. The asphalt with the inert gas, steam or water added through line 98 is sprayed into the tower at the top and the particles are met with the upward flowing inert gas or steam injected through the line 104. Small particles drop out of a chute 106 at the bottom of the spray tower 102 and onto a belt 108 moving over rollers 110 and 102. The belt is continuously cooled by upward flowing air from the blades 114 or by water sprayed against the belt 108 or by both. Asphaltene powder concentrate drops off the belt after it moves over the roller 112.

Figure 2:
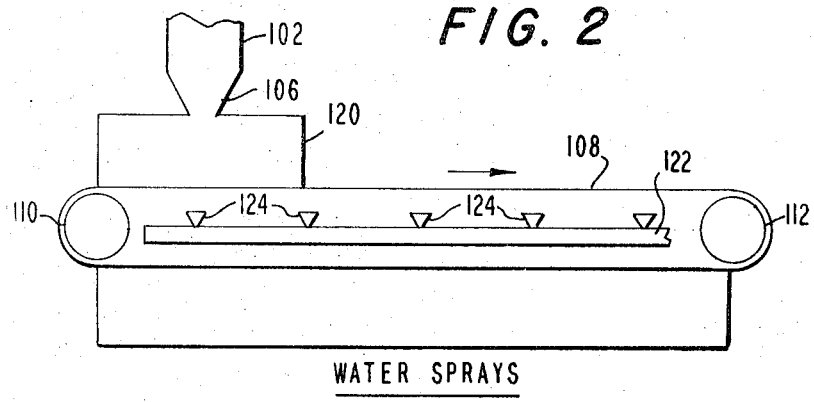
FIG. 2 is a view in elevation of a cooled belt which can be used in accordance with the present invention.
Figure 3:
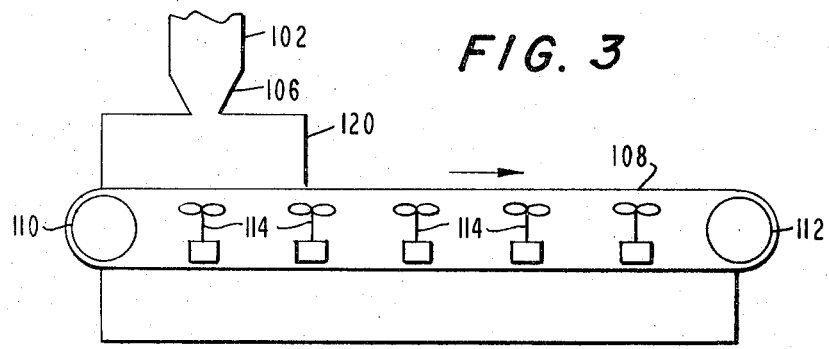
FIG. 3 is a second type of cooled belt which can be used in accordance with the present invention.
Figure 4:
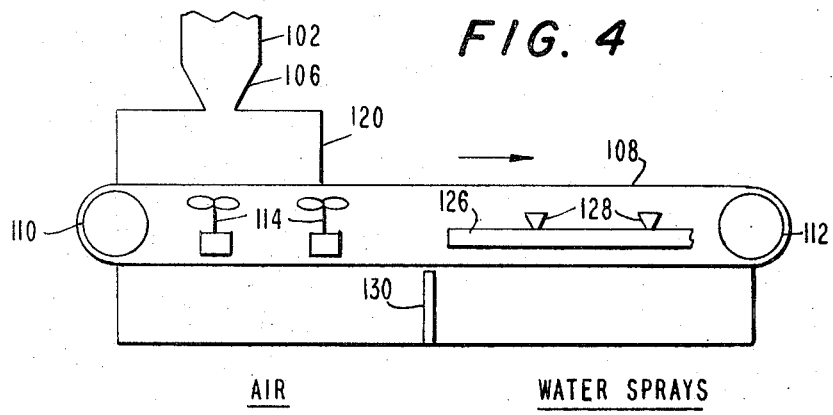
FIG. 4 is a third type of cooled belt which can be used in accordance with the present invention.

The belt 108 can be cooled in several ways as can the belt 86. FIGS. 2, 3 and 4 show different arrangements for cooling the belt 108 but it is understood that they could be used to cool the belt 86. In FIGS. 2, 3 and 4, the asphaltene leaves the spray tower 2 through the chute 106 to fall on the belt 108 while the asphaltene is covered by a hood 120. Rollers 110 and 112 rotate so that a portion of the belt supporting the asphaltene moves in the direction of the arrow and the asphaltene falls off of the belt 108 at the end adjacent to the roller 112. The hood 120 prevents the asphaltene from igniting by limiting the oxygen available to it until it has been cooled substantially. In FIG. 2, the asphaltene is cooled by cooling the belt as it moves over and between rollers 110 and 112 with water which is flowed through a pipe 122 and sprayed upwardly against the belt from sprayers 124 in the pipe 122.

In FIG. 3, the belt is cooled by air directed upwardly against it by fans 114.

FIG. 4 uses both air and water to cool the belt. Water is brought in through a pipe 126 and sprayed through nozzles 128 against the inner surface of the belt. Each portion of the belt passes over the nozzles 128 and then over a divider 130 to be cooled by fans 114 positioned between the divider 130 and the roller 110.

If asphalt from the deasphalting tower 12 is heated to a temperature of between approximately 550°F to approximately 700°F in the heater 24 and taken through the separator 38 to separate out the solvent vapor and subsequently led through the separator 54 to remove more solvent vapor and then through the cooler 78, the product will be a liquid having a melting point of up to 250°F. The addition of flux oil will result in a fuel oil though be it one of a high concentration or sulphur. If the asphalt coming out of the separator 54 is led through the cooler 82 and dumped onto a cool belt 86, a solid material which is mostly asphaltene and which is in the form of flakes will be produced.

If, instead of leading the asphalt to the separator 54, it is led directly to the spray tower 102 and contacted with inert gas or steam before being dropped onto the belt 108 in the form of small particles, an asphaltene concentrate in the form of powder or pellets will be formed. It will have a melting point of approximately 400°F to 500°F whereas the flakes produced from the cooler 82 will have a melting point of approximately 250°F to 400°F. When the pellets are subjected to a wet screen test, the following results are obtained:

| Sieve No. | % On | % Through |
|---|---|---|
| 16 | 0 | 100.0 |
| 50 | 7.6 | 92.4 |
| 100 | 24.8 | 67.6 |
| 140 | 11.6 | 56.0 |
| 200 | 7.2 | 48.8 |
| 325 | 12.8 | 36.0 |
| Pan | 36.0 | |

Both the powder or pellets and the flakes will have a high concentration of asphaltene concentrate. In one case, it has been found that they will have the following approximate analysis:

| | |
|---|---|
| Carbon wt.% | 87.69% |
| Hydrogen wt.% | 7.66% |
| Nitrogen wt.% | 0.95% |
| Sulphur wt.% | 3.40% |
| Sp.Gr. at 60/60 | 1.163 |
| Capillary M.P. °F | 305 |
| Penetration | 0 |
| Pentane Insoluble wt.% | 79.9 |

The foregoing describes but one preferred embodiment of the present invention, other embodiments being possible without exceeding the scope of the present invention as defined in the following claims.

What is claimed is:

1. An appratus for treating the mixture of asphalt and solvent leaving a deep deasphalting tower comprising:

a heater for heating said mixture to at least approximately 600°F;
   a separator for separating solvent from said mixture;
   a spray tower for spraying asphalt through gas;
   a moving cooled surface for receiving the asphalt particles sprayed through said spray tower;
   a cooler;
   a second cooled belt for receiving asphalt; and
   conduit connecting said heater with said separator and said separator with said cooler;
   a second conduit path connecting said heater with said spray tower;
   a first valve in said first conduit path; and
   a second valve in said second conduit path;
   whereby when said first valve is closed, asphalt will flow from said heater to said spray tower where said asphalt will be separated into small particles and said solvent will separate from said asphalt into the form of vapor with said solidified particles falling onto said first cooled belt as powder or asphalt pellets having a high concentration of asphaltene and when said second valve is closed and said first valve is open, asphalt will flow through said separator and said cooler onto said first cooled belt to produce asphalt flakes high in asphaltene concentration.

2. The apparatus defined in claim 1 further comprising a third conduit connected to said second conduit between said separator and said cooler, a line leading to said third conduit for adding flux oil into said asphalt, whereby said asphalt and said flux oil mixed to form a liquid asphalt high in asphaltene concentrate and useful as a fuel oil.

\* \* \* \* \*